(12) United States Patent
Ohta

(10) Patent No.: US 7,464,592 B2
(45) Date of Patent: Dec. 16, 2008

(54) PHYSICAL QUANTITY SENSOR

(75) Inventor: Tameharu Ohta, Takahama (JP)

(73) Assignee: DENSO CORPORATION, Kariya (JP)

( * ) Notice: Subject to any disclaimer, the term of this patent is extended or adjusted under 35 U.S.C. 154(b) by 261 days.

(21) Appl. No.: 11/272,667

(22) Filed: Nov. 15, 2005

(65) Prior Publication Data

US 2006/0112766 A1 Jun. 1, 2006

(30) Foreign Application Priority Data

Dec. 1, 2004 (JP) .............................. 2004-348554

(51) Int. Cl.
*G01N 3/00* (2006.01)

(52) U.S. Cl. .................. 73/526; 73/514.06; 73/514.03; 73/504.17; 73/514.24

(58) Field of Classification Search .................. 73/526, 73/514.06, 514.03, 504.17, 504.14, 504.24, 73/494, 514.05, 493
See application file for complete search history.

(56) References Cited

U.S. PATENT DOCUMENTS

| 4,919,402 A | * | 4/1990 | Doi ....................... 267/140.14 |
| 5,182,949 A | * | 2/1993 | Rupnick et al. .......... 73/514.38 |
| 5,567,878 A | * | 10/1996 | Kobayashi ................ 73/514.12 |
| 5,656,846 A | * | 8/1997 | Yamada ...................... 257/420 |
| 5,716,997 A | * | 2/1998 | Toyosawa et al. .............. 521/52 |
| 5,804,736 A | * | 9/1998 | Klauder et al. ................. 73/724 |
| 6,089,115 A | * | 7/2000 | Yoshioka ...................... 74/417 |
| 6,123,312 A | * | 9/2000 | Dai ............................. 248/550 |
| 6,731,268 B2 | * | 5/2004 | Anton et al. ................. 345/163 |
| 6,974,000 B2 | * | 12/2005 | Carlson et al. ........... 188/267.2 |
| 2002/0141166 A1 | * | 10/2002 | Suhara ....................... 361/752 |
| 2003/0063064 A1 | * | 4/2003 | Braun et al. ................ 345/156 |
| 2003/0088906 A1 | * | 5/2003 | Baker ............................ 2/416 |
| 2003/0110852 A1 | * | 6/2003 | Golly et al. .................... 73/180 |
| 2003/0160369 A1 | * | 8/2003 | LaPlante et al. ............. 267/136 |
| 2004/0074299 A1 | * | 4/2004 | Rud et al. ................. 73/514.26 |
| 2004/0212132 A1 | * | 10/2004 | Tanner ................... 267/140.11 |
| 2004/0254701 A1 | * | 12/2004 | LaPlante et al. ............... 701/37 |
| 2006/0112766 A1 | * | 6/2006 | Ohta ........................... 73/526 |

FOREIGN PATENT DOCUMENTS

JP      A-2000-055667      2/2000

* cited by examiner

*Primary Examiner*—Hezron Williams
*Assistant Examiner*—Gunnar J Gissel
(74) *Attorney, Agent, or Firm*—Posz Law Group, PLC

(57) ABSTRACT

The angular velocity sensor includes a container, a sensing element in the container and a viscous fluid between the container and the sensing element. The sensing element is supported by the viscous fluid such as an ER fluid or an MR fluid. The angular velocity sensor detects acceleration of the body in which the angular velocity sensor is installed. The angular velocity sensor controls the viscosity of the viscous fluid depending on the acceleration of a body, by changing a voltage applied to the viscous fluid.

19 Claims, 3 Drawing Sheets

PHYSICAL QUANTITY SENSOR

CROSS REFERENCE TO RELATED APPLICATION

This application is based on and incorporates herein by reference Japanese Patent Application No. 2004-348554 filed on Dec. 1, 2004.

TECHNICAL FIELD

The technical field relates to a physical quantity sensor having a container and a sensing element installed in the container.

BACKGROUND

Generally, a sensing element of the physical quantity sensor detects physical quantity such as angular velocity and acceleration. However, in some cases, an external impact (i.e. an external acceleration) to the physical quantity sensor damages the performance of the sensing element. For example, an angular velocity sensor usually detects angular velocity according to the Coriolis force along a direction of the detection. When the external impact along the direction affects the sensing element, the angular velocity sensor possibly detects a false angular velocity.

In JP-2000-55667-A, an angular velocity sensor is described which dissipates an unwanted vibration which originates from the impact. Specifically, the angular velocity sensor includes a container having a rubber cushion as a vibration-proof body and supports a sensing element with the rubber. Accordingly, the vibration is damped in a propagation path to the sensing element. Thus the unwanted vibration is suppressed.

However, the stiffness of the body decreases below a tolerable limit when the vibration-proof body is too soft (i.e. with low elasticity). On the other hand, if the vibration-proof body is too hard (i.e. with high elasticity) the effect of the damping decreases.

SUMMARY

In view of the above concerns, it is an object to provide a physical quantity sensor having a container and a sensing element installed in the container in which the amount of damping of the external acceleration at the sensing element is controlled properly.

The physical quantity sensor comprises a container, a sensor element for detecting a physical quantity, and a viscous fluid. In addition, the sensing element is in the container and supported by the viscous fluid. Moreover, the viscosity of the viscous fluid is controllable.

Thus, by controlling the viscosity of the viscous fluid, the amount of damping of the external acceleration at the sensing element is controlled properly. For example, when the viscosity of the viscous fluid is higher, the external acceleration damps faster and the stiffness of the sensor is improved.

BRIEF DESCRIPTION OF THE DRAWINGS

Additional objects, features and advantages will be best understood from the following description, the appended claims and the accompanying drawings in which:

DETAILED DESCRIPTION OF EMBODIMENTS

First Embodiment

Figure 1:
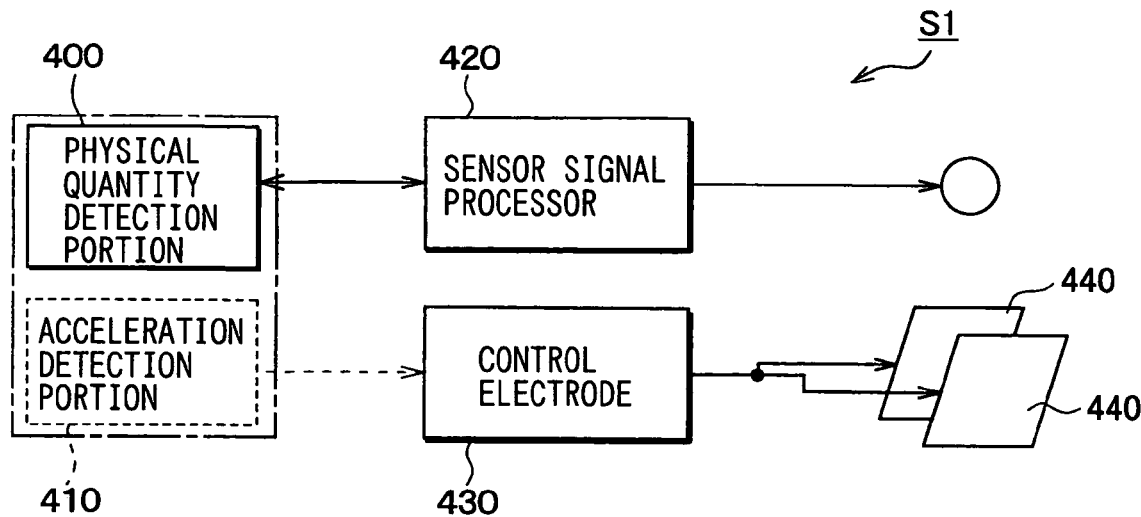
FIG. 1 illustrates an angular velocity sensor S1 as a physical quantity sensor according to a first embodiment.

As shown in FIG. 1, an angular velocity sensor S1 of the first embodiment includes a physical quantity detecting unit 400, an acceleration detecting unit 410, a sensing signal processing circuit 420, an electrode controlling circuit 430, and control electrodes 440.

The physical quantity detecting unit 400 detects angular velocity of the angular velocity sensor S1 and outputs the detected angular velocity to the sensing signal processing circuit 420 as an electrical signal. The angular velocity of the angular velocity sensor S1 can be regarded as angular velocity of an object (e.g. a vehicle) in which the velocity sensor S1 is installed.

The acceleration detecting unit 410 detects acceleration of the velocity sensor S1. Hereafter, the acceleration is referred to as external acceleration. The acceleration detecting unit 410 outputs the detected acceleration as an electrical signal to the electrode controlling circuit 430. The acceleration detecting unit 410 may be a capacitance-type acceleration detector which has a movable electrode and a comb teeth shaped fixed electrode.

The sensing signal processing circuit 420 sends a signal to the physical quantity detecting unit 400. The physical quantity detecting unit 400 also amplifies and transforms the output signal from the physical quantity detecting unit 400 and outputs the resultant signal.

The electrode controlling circuit 430 applies a voltage between the control electrodes 440 according to the output signal from the acceleration detecting unit 410.

Each of the sensing signal processing circuit 420 and electrode controlling circuit 430 may be an IC chip which is made by forming MOS transistors and/or bipolar transistors on a semiconductor board through well-known semiconductor processes.

Figure 2:
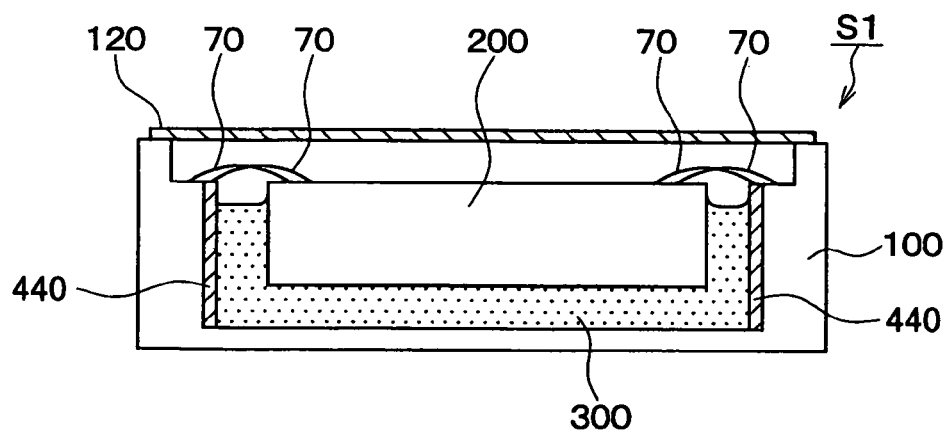
FIG. 2 illustrates a cross-sectional view of the angular velocity sensor.

Specifically, the angular velocity sensor S1 is constructed as shown in FIG. 2. The angular velocity sensor S1 includes bonding wires 70, a container 100, a lid 120, a sensing element 200 and a viscous fluid 300, as well as the control electrodes 440, the acceleration detecting unit 410 (not illustrated in FIG. 2), the sensing signal processing circuit 420 (not illustrated in FIG. 2) and the electrode controlling circuit 430 (not illustrated in FIG. 2).

The detecting unit 410 may be in the sensing element 200 or another position in the container 100. The circuits 420 and 430 may be in the sensing element 200, other position in the container 100, or at the outside of the container 100.

The sensing element 200 is installed in the container 100 and includes the physical quantity detecting unit 400. The viscous fluid 300 may be filled between the container 100 and the sensing element 200 and supports the sensing element 200.

The container 100 containing the sensing element 200 and the viscous fluid 300 is a main body of the angular velocity sensor S1. The container 100 is attached to a portion of an object such as a vehicle, wherein the portion is suitable to measure the angular velocity of the object. The container 100 is made of, for example, ceramic or resin.

Specifically, the container 100 is, for example, a laminated circuit board having ceramic layers such as alumina layers. Wirings may be installed on surfaces of the layers or within through-holes of the layers. The angular velocity sensor S1 can be electrically connected with an external device through the wirings.

The control electrodes 440 are installed on the container 100. The electrodes 440 are for controlling the viscosity of the viscous fluid 300. The control electrodes 440 may be aluminum plates or copper plates which are attached to the container 100. The viscosity of the viscous fluid 300 is controlled by a voltage between the control electrodes, as described later.

The container 100 also has an opening, to which the lid 120 is attached by welding and brazing. Thus, the lid 120 confines the control electrodes 440, the sensing element 200 and the viscous fluid 300 in the container 100. The lid 120 may be made of resin or ceramic.

Figure 3:
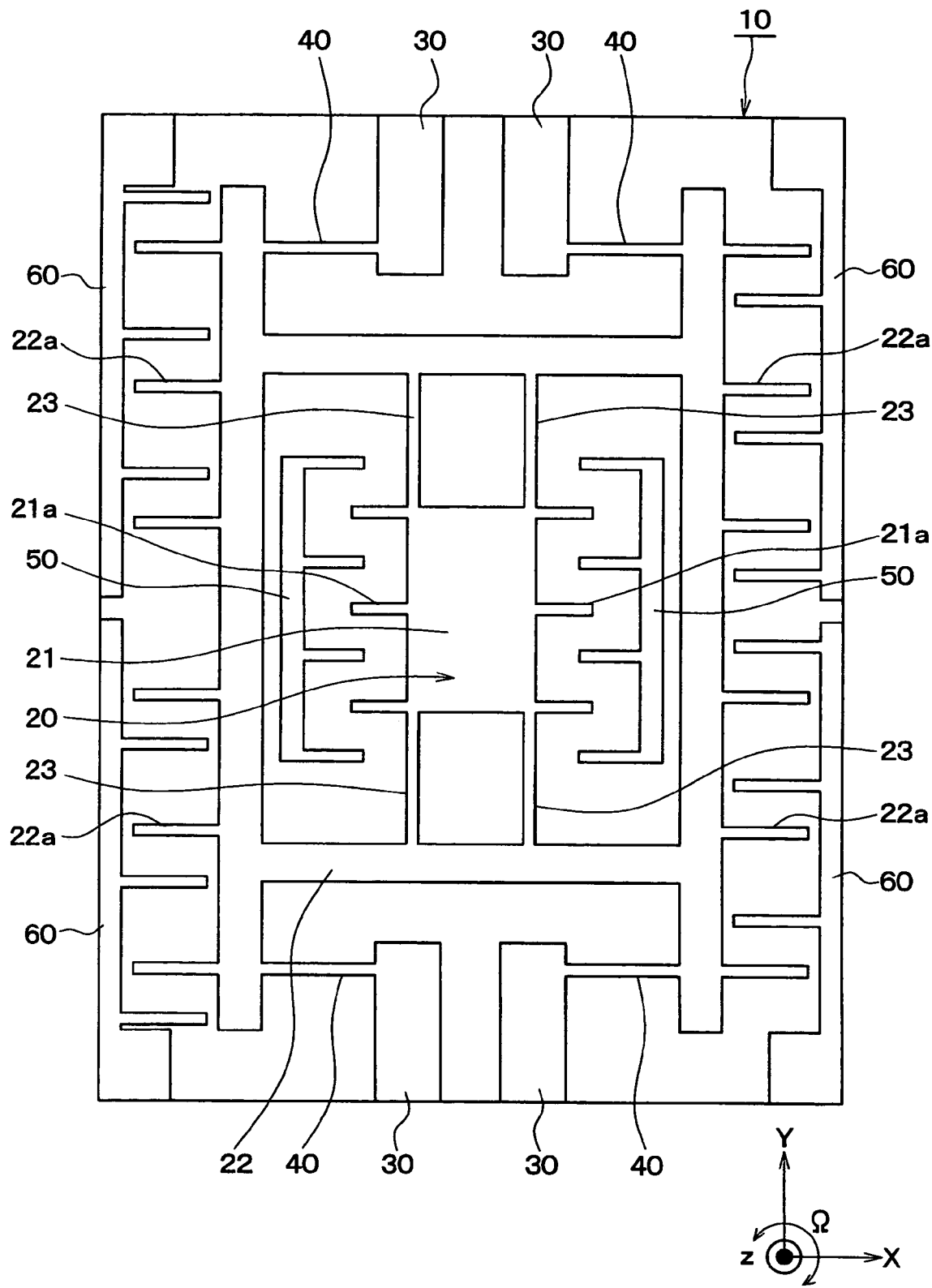
FIG. 3 illustrates a top view of a sensing element of the angular velocity sensor.

The sensing element 200 includes a sensor chip 10 shown in FIG. 3, which functions as the physical quantity detecting unit 400. The sensor chip 10 includes a substrate such as a semiconductor substrate which is processed microelectromechanically.

For example, the substrate may be a rectangular silicon-on-insulator (SOI) substrate, which includes a first silicon layer (first semiconductor layer) and a second silicon layer (second semiconductor layer) which are attached to each other through an oxide film (insulating layer).

The surface of the substrate has a beam structure 20-60 as shown in FIG. 3. The beam structure 20-60 is made by applying trench etching or release etching to the surface (e.g. the second silicon layer in SOI substrate).

The beam structure 20-60 includes an oscillating body 20 for detecting angular velocity, anchoring objects 30, beams 40, driving electrodes 50 and detecting electrodes 60.

The oscillating body 20 is at the center of the sensor chip 10 and can oscillate parallel to the substrate surface of the sensor chip 10, that is, parallel to the X-Y plane in FIG. 3. The oscillating body 20 includes a first portion 21, a second portion 22 and four beams 23. The first portion 21 is at the center of the oscillating body 20 and has a rectangular shape. The first portion 21 includes comb teeth (driving comb teeth) 21a which stick out from the main body of the first portion 21 in the X direction in FIG. 3. The second portion 22 surrounds the first portion 21 and has a shape of a rectangular frame. The second portion 22 includes comb teeth (detecting comb teeth) 22a which stick out from the main body of the second portion 22 to the X direction. Each of the beams 23 is connected with the first portion 21 and the second portion 22.

The oscillating body 20 is connected with four anchoring objects 30 at edges of the sensor chip 10 through the beam 40. The beams 40 are fixed to the lower part of the sensor chip 10 at its one end and the oscillating body 20 is detached from the lower part at its other end.

As shown in FIG. 3, the beams 23 are elastically deformable mostly to the X direction because they are long in the Y direction. In addition, the beams 40 are elastically deformable mostly to the Y direction because they are long in the X direction.

Thus, the first portion 21 can oscillate toward the X direction (hereafter driving direction) in the X-Y plane because of the beams 23. Moreover, the oscillating body 20 can oscillate as a whole toward the Y direction (hereafter detecting direction) in the X-Y plane because of the beams 40.

The driving electrodes 50 are between the first portion 21 and the second portion 22 and are for making the first portion 21 oscillate toward the driving direction. As the anchoring object 30, the driving electrodes 50 are fixed to the lower part of the sensor chip 10. In addition, each driving electrode 50 has a shape of comb teeth, which meshes with the comb teeth 21a.

The detecting electrodes 60 are located around the second portion 22. The detecting electrodes 60 are for detecting angular velocity around the Z-axis, which is perpendicular to the sensor chip 10. The detection is made according to the oscillation of the oscillating body 20. As the anchoring object 30, the detecting electrodes 60 are fixed to the lower part of the sensor chip 10. In addition, each detecting electrode 60 has a shape of comb teeth, which meshes with the comb teeth 22a.

In addition, pads (not illustrated) are attached to the sensor chip 10, which apply voltages to the driving electrodes 50 and obtain signals from the detecting electrodes 60.

The pads are attached to the bonding wires 70 which are made of, for example, gold or aluminum. The bonding wires 70 are attached to the wirings (not illustrated) in the container 100. Thus, the sensor chip 10 and the wirings in the container 100 are electrically connected with each other through the bonding wires 70.

The viscous fluid 300 may be any functional fluid if its viscosity is controllable externally. In this embodiment, the viscous fluid 300 changes its viscosity according to a voltage applied between the control electrodes 440.

For example, a well-known electrorheological (ER) fluid can be used as the viscous fluid 300. The ER fluid changes its viscosity according to electric field applied to it. If the ER fluid is used as the viscous fluid 300, the control electrodes 440 are for applying the electric field to the ER fluid.

Otherwise, a well-known magnetorheological (MR) fluid can be used as the viscous fluid 300. The MR fluid changes its viscosity according to magnetic field applied to it. If the MR fluid is used as the viscous fluid 300, the control electrodes 440 are for applying the magnetic field to the ER fluid. In this case, the container 100 can be a coil which generates the magnetic field on receiving an electrical current.

The ER fluid and the MR fluid include insulating liquid such as oil and gel, and solid particles distributed in the insulating liquid. Each of the solid particles is dielectric and its radius is about micrometers. When the electric field or the magnetic field is not applied to the fluid, the solid particles are distributed uniformly in the liquid. When the electric or the magnetic field is applied to the fluid, the solid particles gather to form a chain-like cluster along the direction of the applied field.

In this situation, the fluid behaves like a solid body against shear stress. In other words, the viscosity of the fluid becomes larger when the electric field or the magnetic field becomes stronger.

Thus, the ER fluid and the MR fluid change their viscosity according to the magnitude of the electric field and the magnetic field, respectively.

The viscosity of the liquid part of the viscous fluid 300 is adjusted so that its viscosity is sufficient for properly supporting the sensing element 200 when no voltage is applied between the control electrodes 440. The viscosity of the liquid part is referred to as the initial viscosity.

The sensing element 200 may only have the sensor chip 10. Otherwise, the sensing element 200 may have a box which contains the sensor chip 10 therein. In the latter case, either of the acceleration detecting unit 410, sensing signal processing circuit 420 and electrode controlling circuit 430 may be chips in the box. In both cases, either of the unit 410, circuit 420 and circuit 430 may be installed on a location of the substrate of the sensor chip 10, wherein the location is apart from the location of the physical quantity detecting unit 400.

The electrical connection among the units 400, 410, the circuits 420, 430 and the control electrodes 440 can be achieved by means of wiring on the chip if they are on the same chip. If they are not on the same chip, the electrical connection can be achieved by means of bonding wires or the wirings in the container 100.

Hereafter, the operation of the angular velocity sensor S1 for detecting the angular velocity will be described mainly with reference to FIG. 1 and FIG. 3.

The sensing signal processing circuit 420 outputs a driving signal, such as a sine wave voltage, to the driving electrodes 50 to generate electrostatic forces between the comb teeth 21a and the driving electrodes 50. Then, the first portion 21 oscillates along the driving direction by virtue of the elasticity of the beams 23.

If the sensor chip 10 rotates around the Z-axis in FIG. 3 while the first portion 21 is oscillating, the first portion 21 receives a Coriolis force and therefore the oscillating body 20 oscillates along the detecting direction by virtue of the elasticity of the beams 40.

In this case, the capacitance between the detecting electrodes 60 and the comb teeth 22a changes. Then the sensing signal processing circuit 420 obtains the angular velocity $\Omega$ of the rotation by detecting the change of the capacitance.

Specifically, when the oscillating body 20 moves along the detecting direction, the capacitances of electrodes 60 at the left side and the right side in FIG. 2 change oppositely.

The sensing signal processing circuit 420 converts the change of the capacitance at the both sides to voltages, subtracts one of the voltages from the other, amplifies the resultant voltage and outputs the voltage. Thus, the outputted voltage indicates the angular velocity $\Omega$ of the rotation.

Hereafter, the operation of the angular velocity sensor S1 for controlling the viscosity of the viscous fluid 300 will be described.

The electrode controlling circuit 430 receives the external acceleration detected by the acceleration detecting unit 410 and applies the voltage, which depends on the external acceleration, between the control electrodes 440. Therefore, the viscosity of the viscous fluid 300 changes along with the change of the external acceleration.

For example, the voltage to be applied may behave as an increasing function of the external acceleration. More specifically, the voltage to be applied may be proportional to the external acceleration. In this case, when the external acceleration is larger, the external acceleration damps faster and the stiffness of the sensor is improved.

The relationship between the applied voltage and the amount of the damping of the external acceleration through the viscous fluid 300 may be obtained beforehand by experiments. The electrode controlling circuit 430 may control the voltage to achieve the desired amount of the damping by means of the obtained relationship.

As described above, the sensing element 200 in the container 100 is supported by the viscous fluid 300 and the viscosity of the viscous fluid 300 changes depending on the external acceleration.

Therefore, the angular velocity sensor S1 can properly control the amount of the damping of the external acceleration at the sensing element 200, according to the external acceleration.

Second Embodiment

Figure 4:
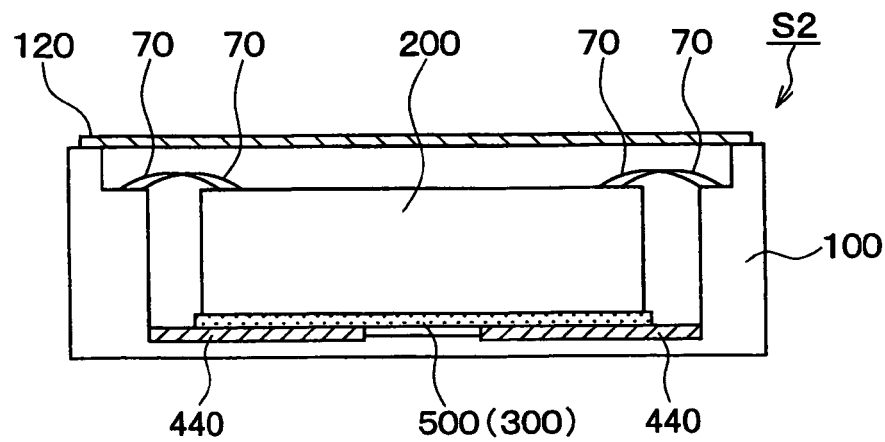
FIG. 4 shows a cross-sectional view of an angular velocity sensor as a physical quantity sensor according to a second embodiment.

As shown in FIG. 4, an angular velocity sensor S2 of the second embodiment differs from the angular velocity sensor S1 of the first embodiment in that the control electrodes 440 are on the bottom of the container 100, that a polymer (hereafter holding polymer) 500 is on the control electrodes 440, that the sensing element 200 is fixed to the container 100 through the holding polymer 500 and the control electrodes 440, and that the viscous fluid 300 soaks in the holding polymer 500.

The holding polymer 500 is capable of absorbing the viscous fluid 300. By absorbing the viscous fluid 300, the holding polymer 500 becomes a gel or a semisolid. In addition, the holding polymer 500 may be an adhesive. The holding polymer 500 may be a resin such as a sponge.

The angular velocity sensor S2 can control the viscosity of the viscous fluid 300 in the holding polymer 500 according to the change of the external acceleration similarly to the angular velocity sensor S1. Therefore, the angular velocity sensor S2 can properly control the amount of damping of the external acceleration at the sensing element 200 according to the change of the external acceleration.

Third Embodiment

Figure 5:
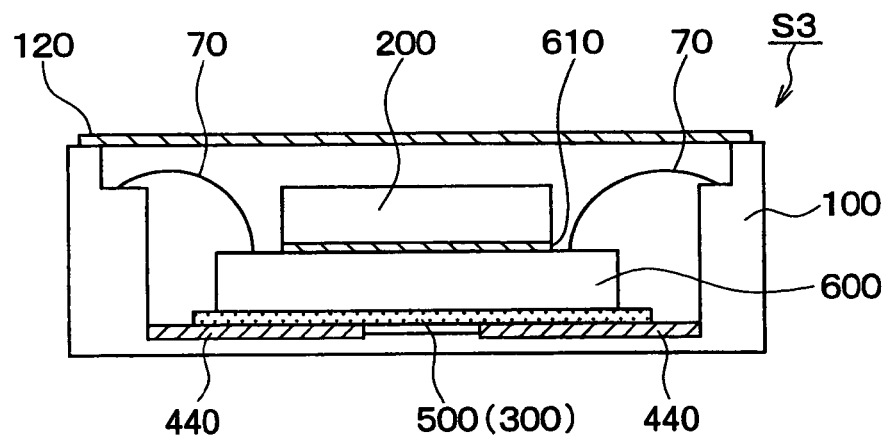
FIG. 5 shows a cross-sectional view of an angular velocity sensor as a physical quantity sensor according to a third embodiment.

As shown in FIG. 5, the angular velocity sensor S3 of the third embodiment differs from the angular velocity sensor S2 of the second embodiment in that the sensing element 200 is fixed to a circuit board 600 through an adhesive 610, that the circuit board 600 is fixed to the container 100 through the holding polymer 500 and the control electrodes 440, and that the bonding wires 70 are connected with the circuit board 600.

The circuit board 600 contains the sensing signal processing circuit 420 and the electrode controlling circuit 430, and is electrically connected with the sensing element 200 through bonding wires or like (not illustrated).

The angular velocity sensor S3 can control the viscosity of the viscous fluid 300 in the holding polymer 500 according to the change of the external acceleration as the angular velocity sensor S2 does. Therefore, the angular velocity sensor S3 can control the amount of damping of the external acceleration at the sensing element 200 properly according to the change of the external acceleration.

Fourth Embodiment

Figure 6:
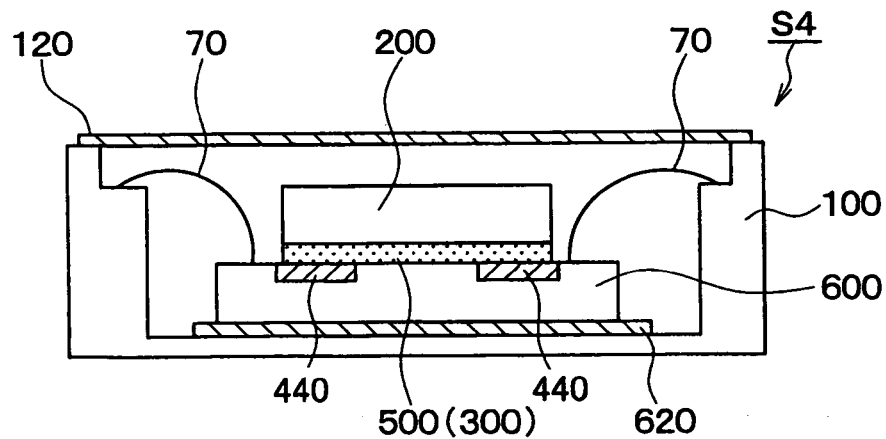
FIG. 6 shows a cross-section view of an angular velocity sensor as a physical quantity sensor according to a fourth embodiment.

As shown in FIG. 6, the angular velocity sensor S4 of the fourth embodiment differs from the angular velocity sensor S3 of the third embodiment in that the circuit board 600 is fixed to the bottom of the container 100 through an adhesive 620, that the sensing element 200 is fixed to the circuit board 600 through the holding polymer 500 and that the control electrodes 440 are between the holding polymer 500 and the circuit board 600. The control electrodes 440 may be formed on the circuit board by means of semiconductor manufacturing technology.

The angular velocity sensor S4 can control the viscosity of the viscous fluid 300 in the holding polymer 500 according to the change of the external acceleration as the angular velocity sensor S3 does. Therefore, the angular velocity sensor S4 can control the amount of damping of the external acceleration at the sensing element 200 properly according to the change of the external acceleration.

Other Embodiments

The present invention should not be limited to the embodiments discussed above and shown in the figures, but may be implemented in various ways without departing from the spirit of the invention.

For example, the holding polymer 500 may be replaced with any substance other than a polymer if the substance becomes a gel or a semisolid by absorbing the viscous fluid 300.

In addition, the physical quantity sensor may detect any other physical quantity other than the angular velocity if the sensor includes a container and a sensing element in the container.

For example, the sensing element may detect the acceleration and the physical quantity sensor may control the damping of the external acceleration at the sensing element properly according to the change of the external acceleration. In this case, the controlling contributes to maintaining the sensitivity of the sensing element and the stiffness of the physical quantity sensor. Additionally in this case, the acceleration detecting unit 410 may be at the outer side of the container 100 and the electrode controlling circuit 430 may control the voltage according to the acceleration detecting unit 410.

In addition, the physical quantity sensor may control the amount of damping of the external acceleration at the sensing element 200 properly according to the change of the velocity of the physical quantity sensor.

In addition, the viscous fluid 300 may be filled in the container 100.

What is claimed is:

1. A physical quantity sensor, comprising:
   a container;
   a sensing element installed in the container for detecting a physical quantity; and
   a viscous fluid that provides a damping when an external acceleration different from the physical quantity is applied to the sensor element; wherein:
   the sensing element is supported by the viscous fluid;
   a viscosity of the viscous fluid is controllable by applying a voltage having an electric field and a magnetic field associated therewith, the voltage proportional to a magnitude of the external acceleration, the voltage changing the viscosity such that when the external acceleration is increased, the viscosity is increased proportionally thereby increasing an effective stiffness of the sensing element;
   the sensing element includes a rectangular silicon-on-insulator (SOI) substrate having a beam structure, the beam structure including an oscillating body for detecting angular velocity, driving electrodes and detecting electrodes; and
   the driving electrodes are provided with driving comb teeth and the detecting electrodes are provided with detecting comb shaped teeth.

2. The physical quantity sensor according to claim 1, wherein the viscous fluid is an electrorheological fluid, wherein the viscosity of the electrorheological fluid changes in accordance with the electric field applied to the electrorheological fluid, and the physical quantity sensor further comprises an electrode for applying the electric field to the electrorheological fluid.

3. The physical quantity sensor according to claim 1, wherein the viscous fluid is a magnetorheological fluid, wherein the viscosity of the magnetorheological fluid changes in accordance with the magnetic field applied to the magnetorheological fluid, and the physical quantity sensor further comprises an electrode for generating the magnetic field to apply to the electrorheological fluid.

4. The physical quantity sensor according to claim 2, wherein the electrode is installed in the container.

5. The physical quantity sensor according to claim 2, further comprising:
   a holding body for absorbing the viscous fluid; and
   a circuit board supported by the container through the holding body, wherein:
   the sensing element is fixed to the circuit board; and
   the electrode is installed in the container.

6. The physical quantity sensor according to claim 2, further comprising:
   a holding body for absorbing the viscous fluid, and
   a circuit board fixed to the container, wherein:
   the sensing element is supported by the circuit board through the holding body; and
   the electrode is formed on the circuit board.

7. The physical quantity sensor according to claim 1, further comprising a holding body for absorbing the viscous fluid, wherein the sensing element is fixed to the container through the holding the body.

8. The physical quantity sensor according to claim 7, wherein the holding body is a polymer.

9. The physical quantity sensor according to claim 1, further comprising:
   an acceleration detecting unit for detecting the acceleration at the sensing element; and
   a controller for controlling the viscosity of the viscous fluid depending on the detected external acceleration by applying the voltage.

10. The physical quantity sensor according to claim 1, further comprising:
    an electrode for applying the electric field to the viscous fluid;
    a holding body for absorbing the viscous fluid; and
    a circuit board supported by the container through the holding body, wherein:
    the sensing element is fixed to the circuit board; and
    the electrode is installed in the container.

11. The physical quantity sensor according to claim 1, further comprising:
    an electrode for applying the electric field to the viscous fluid;
    a holding body for absorbing the viscous fluid; and
    a circuit board fixed to the container, wherein:
    the sensing element is supported by the circuit board through the holding body; and
    the electrode is formed on the circuit board.

12. The physical quantity sensor according to claim 1, wherein the physical quantity sensor further comprises a control circuit controlling the voltage to be applied, the voltage being proportional to an external acceleration different from the physical quantity, and wherein the voltage to be applied and the amount of the damping of the external acceleration are controlled through a predetermined relationship therebetween.

13. The physical quantity sensor according to claim 1, wherein the sensor further comprises:

an acceleration detection unit for detecting a value of the external acceleration;

control electrodes; and a control unit coupled to the control electrodes and the acceleration detecting unit, the control unit controlling the viscosity of the viscous fluid, the control unit configured to:

receive the value of the external acceleration detected by the acceleration detecting unit;

determine a relationship between the external acceleration and a damping factor that is associated with the viscosity of the viscous fluid; and apply the voltage based on the external acceleration, between the control electrodes to thereby change the viscosity of the viscous fluid with a change in the value of the external acceleration associated.

14. A physical quantity sensor, comprising:

a container;

a sensing element installed in the container for detecting a physical quantity; and a viscous fluid that provides a damping when an external acceleration different from the physical quantity is applied to the sensor element; wherein:

the sensing element is supported by the viscous fluid;

a viscosity of the viscous fluid is controllable by applying a voltage having an electric field and a magnetic field associated therewith, the voltage proportional to a magnitude of the external acceleration, the voltage changing the viscosity such that when the external acceleration is increased, the viscosity is increased proportionally thereby increasing an effective stiffness of the sensing element; and the physical quantity sensor further comprises a holding body for absorbing the viscous fluid, wherein the sensing element is fixed to the container through the holding body; and the holding body includes a substance that becomes one of a gel and a semisolid by absorbing the viscous fluid.

15. A physical quantity sensor, comprising;

a container;

a sensing element installed in the container for detecting a physical quantity; and a viscous fluid that provides a damping when an external acceleration different from the physical quantity is applied to the sensor element; wherein:

the sensing element is supported by the viscous fluid;

a viscosity of the viscous fluid is controllable by applying a voltage having an electric field and a magnetic field associated therewith, the voltage proportional to a magnitude of the external acceleration, the voltage changing the viscosity such that when the external acceleration is increased, the viscosity is increased proportionally thereby increasing an effective stiffness of the sensing element;

the sensing element includes a rectangular silicon-on-insulator (SOI) substrate having a beam structure, the beam structure including an oscillating body for detecting the physical quantity, driving electrodes and detecting electrodes; and the driving electrodes are provided with driving teeth that are comb shaped and the detecting electrodes are provided with detecting teeth that are comb shaped.

16. The physical quantity sensor according to claim 15, wherein:

the oscillating body includes a first portion at the center thereof, the first portion having a rectangular shape; and the oscillating body oscillates parallel to the surface of the SOI substrate.

17. The physical quantity sensor according to claim 16, wherein the oscillating body further includes elastically deformable beams that are long in a first direction and deformable in a direction generally perpendicular to the first direction.

18. The physical quantity sensor according to claim 15, wherein the driving comb shaped teeth are configured so as to mesh and the detecting comb shaped teeth are configured so as to mesh.

19. A physical quantity sensor, comprising:

a container;

a sensing element installed in the container for detecting a physical quantity; and a viscous fluid that provides a damping when an external acceleration different from the physical quantity is applied to the sensor element; wherein:

the sensing element is supported by the viscous fluid;

a viscosity of the viscous fluid is controllable by applying a voltage having an electric field and a magnetic field associated therewith, the voltage proportional to a magnitude of the external acceleration;

the voltage changes the viscosity such that when the external acceleration is increased, the viscosity is increased proportionally thereby increasing an effective stiffness of the sensing element;

the sensor further comprises:

an acceleration detection unit for detecting a value of the external acceleration;

control electrodes; and a control unit coupled to the control electrodes and the acceleration detecting unit, the control unit controlling the viscosity of the viscous fluid, wherein the control unit is configured to receive the value of the external acceleration detected by the acceleration detecting unit, determine a relationship between the external acceleration and a damping factor that is associated with the viscosity of the viscous fluid, and apply the voltage based on the external acceleration, between the control electrodes to thereby change the viscosity of the viscous fluid with a change in the value of the external acceleration associated; and the acceleration detection unit includes a capacitance-type acceleration detector having a movable electrode and a fixed electrode with comb shaped teeth.

* * * * *